United States Patent
Chapman et al.

(10) Patent No.: US 11,426,983 B2
(45) Date of Patent: Aug. 30, 2022

(54) CARBON FIBER DECORATIVE VENEER

(71) Applicant: GOODRICH CORPORATION, Charlotte, NC (US)

(72) Inventors: Christopher L. Chapman, Georgetown, IN (US); Brian Barnett, New Albany, IN (US)

(73) Assignee: Goodrich Corporation, Charlotte, NC (US)

( * ) Notice: Subject to any disclaimer, the term of this patent is extended or adjusted under 35 U.S.C. 154(b) by 128 days.

(21) Appl. No.: 16/389,244

(22) Filed: Apr. 19, 2019

(65) Prior Publication Data

US 2020/0331239 A1    Oct. 22, 2020

(51) Int. Cl.
| | |
|---|---|
| *B32B 21/10* | (2006.01) |
| *B32B 3/12* | (2006.01) |
| *B32B 7/12* | (2006.01) |
| *B32B 21/04* | (2006.01) |
| *B32B 37/12* | (2006.01) |

(52) U.S. Cl.
CPC .............. *B32B 21/10* (2013.01); *B32B 3/12* (2013.01); *B32B 7/12* (2013.01); *B32B 21/042* (2013.01); *B32B 37/12* (2013.01); *B32B 2262/106* (2013.01); *B32B 2605/18* (2013.01)

(58) Field of Classification Search
CPC .. B32B 3/12; B32B 7/12; B32B 21/10; B32B 21/042; B32B 2262/106; B32B 2605/18; B32B 21/14; B32B 21/00; B32B 21/04; B27D 1/00; B64C 1/40
See application file for complete search history.

(56) References Cited

U.S. PATENT DOCUMENTS

| | | | |
|---|---|---|---|
| 2016/0114556 A1 | 4/2016 | Le Lay et al. | |
| 2016/0264229 A1* | 9/2016 | Taguchi | B64D 11/00 |
| 2017/0015081 A1 | 1/2017 | Massarelli et al. | |
| 2017/0106620 A1 | 4/2017 | Smith et al. | |
| 2018/0022967 A1* | 1/2018 | Pyun | C09J 7/385 |
| | | | 428/355 AC |
| 2018/0162086 A1 | 6/2018 | Teutsch | |
| 2018/0370185 A1* | 12/2018 | Darlington | B32B 7/02 |

FOREIGN PATENT DOCUMENTS

| | | | | |
|---|---|---|---|---|
| CA | 2936290 | | 1/2017 | |
| CN | 108481492 | | 9/2018 | |
| DE | 202016102228 | | 5/2017 | |
| DE | 102016107789 A1 * | | 11/2017 | ............. B32B 15/12 |
| EP | 2522503 A2 * | | 11/2012 | ............. B32B 19/04 |
| WO | 2015098983 | | 7/2015 | |

OTHER PUBLICATIONS

Translation of EP2522503A2 (abstract, description and claims). (Year: 2012).*
Translation of DE102016107789 (description and claims). (Year: 2017).*
European Patent Office, European Search Report dated Jun. 3, 2020 in Application No. 19213857.6.
European Patent Office, European Office Action dated Mar. 17, 2022 in Application No. 19213857.6.

* cited by examiner

Primary Examiner — Catherine A. Simone
(74) Attorney, Agent, or Firm — Snell & Wilmer L.L.P.

(57) ABSTRACT

A veneer panel includes a face layer formed from a carbon fiber sheet. The veneer panel further includes a backing layer. The veneer panel further includes a thermoset dry film adhesive located between the face layer and the backing layer and attaching the face layer to the backing layer.

20 Claims, 4 Drawing Sheets

CARBON FIBER DECORATIVE VENEER

FIELD

The present disclosure relates to decorative panels and, more specifically, to a veneer panel having a carbon fiber decorative layer coupled to a base layer.

BACKGROUND

Current veneer panels may include a backer substrate, such as wood, and may thus be susceptible to tearing, wrinkling, and curling. For example, veneer panels may include one or more veneer ply coupled to a poplar backer. The backer, usually wood, on the decorative surface of the veneer may experience warping, separation, or other undesirable cosmetic effects. Many existing veneer panels may not be useable in aerospace applications due to limitations such as conformance with flammability regulations and conformance with customer specifications for the veneer panels.

SUMMARY

Disclosed herein is a veneer panel that includes a face layer formed from a carbon fiber sheet. The veneer panel further includes a backing layer. The veneer panel further includes a thermoset dry film adhesive located between the face layer and the backing layer and attaching the face layer to the backing layer.

In any of the foregoing embodiments, the carbon fiber sheet is untreated.

In any of the foregoing embodiments, the thermoset dry film adhesive is a flame-retardant, B-staged modified acrylic adhesive.

In any of the foregoing embodiments, the backing layer includes at least two plies of a wood material.

In any of the foregoing embodiments, the backing layer is treated by submerging the backing layer into a water-based fire retardant.

In any of the foregoing embodiments, the face layer has a face thickness between 0.005 inches (0.127 millimeters) and 0.05 inches (1.27 millimeters).

In any of the foregoing embodiments, the thermoset dry film adhesive has an adhesive thickness of between 0.001 inches (0.0254 millimeters) and 0.01 inches (0.254 millimeters).

In any of the foregoing embodiments, the veneer panel satisfies requirements set forth in Federal Aviation Regulations (FAR) Section 25.853.

Also disclosed is a panel assembly for use in an aircraft. The panel assembly includes a first veneer panel having: a face layer formed from a carbon fiber sheet, a backing layer, and a thermoset dry film adhesive located between the face layer and the backing layer and attaching the face layer to the backing layer. The panel assembly further includes a second veneer panel. The panel assembly further includes an aviation honeycomb layer coupled between the first veneer panel and the backing layer of the second veneer panel.

In any of the foregoing embodiments, the carbon fiber sheet is untreated.

In any of the foregoing embodiments, the thermoset dry film adhesive is a flame-retardant, B-staged modified acrylic adhesive.

In any of the foregoing embodiments, the backing layer includes at least two plies of a wood material and is treated by submerging the backing layer into a water-based fire retardant.

In any of the foregoing embodiments, the face layer has a face thickness between 0.005 inches (0.127 millimeters) and 0.05 inches (1.27 millimeters).

In any of the foregoing embodiments, the thermoset dry film adhesive has an adhesive thickness of between 0.001 inches (0.0254 millimeters) and 0.01 inches (0.254 millimeters).

In any of the foregoing embodiments, the panel assembly satisfies requirements set forth in Federal Aviation Regulations (FAR) Section 25.853.

Also disclosed is a method of forming a panel assembly for use in an aircraft. The method includes treating a backing layer with a fire retardant. The method further includes placing a thermoset dry film adhesive between the backing layer and a face layer formed from a carbon fiber sheet. The method further includes curing the thermoset dry film adhesive to couple the backing layer to the face layer to form a first veneer panel.

In any of the foregoing embodiments, the carbon fiber sheet is untreated and the thermoset dry film adhesive is a flame-retardant, B-staged modified acrylic adhesive.

Any of the foregoing embodiments may further include obtaining or forming a second veneer panel and an aviation honeycomb layer having a first surface and a second surface, and coupling the first veneer panel to the first surface of the aviation honeycomb layer and coupling the second veneer panel to the second surface of the aviation honeycomb layer to form the panel assembly.

In any of the foregoing embodiments, the face layer has a face thickness between 0.005 inches (0.127 millimeters) and 0.05 inches (1.27 millimeters), and the thermoset dry film adhesive has an adhesive thickness of between 0.001 inches (0.0254 millimeters) and 0.01 inches (0.254 millimeters).

In any of the foregoing embodiments, the backing layer includes at least two plies of a wood material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
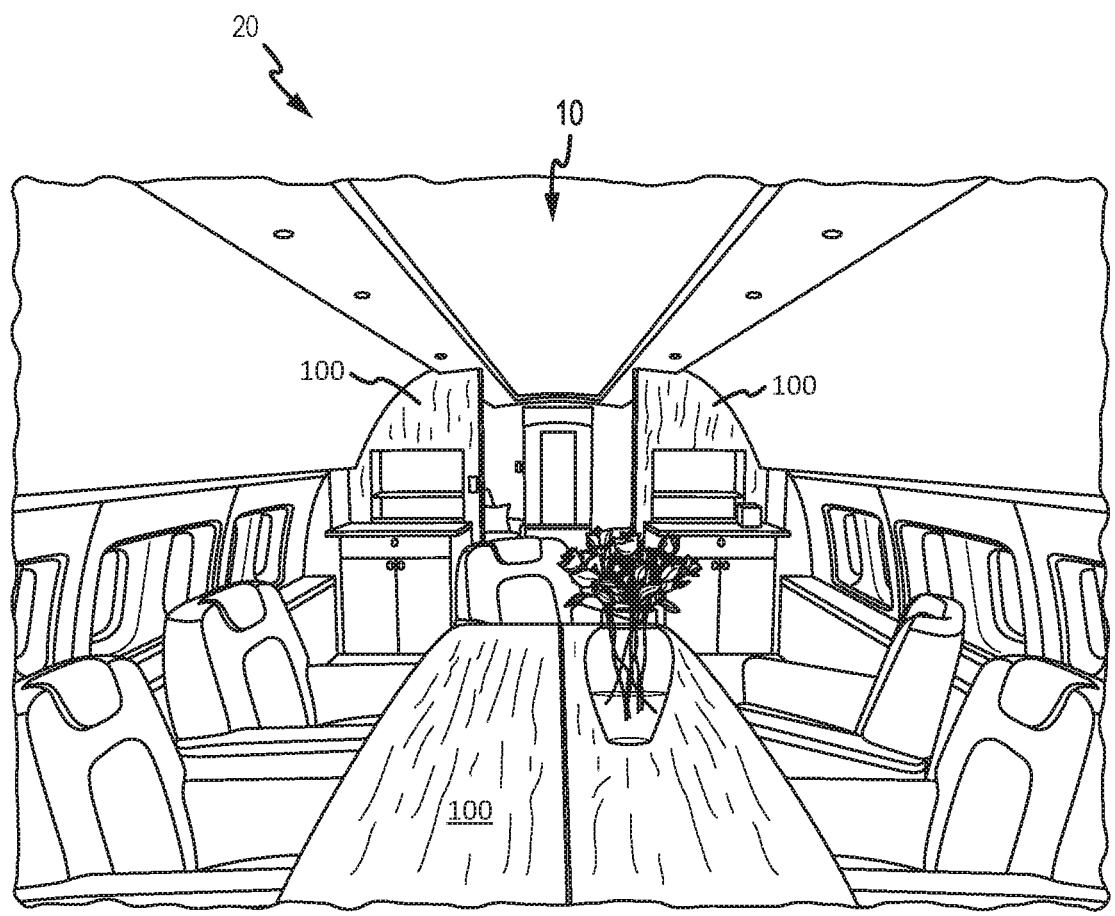
FIG. 1 illustrates an aircraft interior including various components with a panel assembly having one or more veneer panels, in accordance with various embodiments.

Referring now to FIG. 1, an aircraft interior 10 of an aircraft 20 may include multiple panel assemblies 100. Each of the panel assemblies 100 may be designed for use in the aircraft 20. For example, the panel assemblies 100 may be used to form cabinets, doors, or other structures within the aircraft 20. In that regard, the panel assemblies 100 may be designed to satisfy the requirements set forth in Federal Aviation Regulations (FAR) Section 25.853. This Section sets forth that materials used in the construction of interiors of aircraft be self-extinguishing when tested vertically (i.e., exposed to flame while located in a vertical orientation). The average burn length is not to exceed 6 inches and the average flame time after removal of the flame source is not to exceed 15 seconds. Drippings from the test specimen are not to continue to flame for more than an average of 3 seconds after falling.

Figure 2:
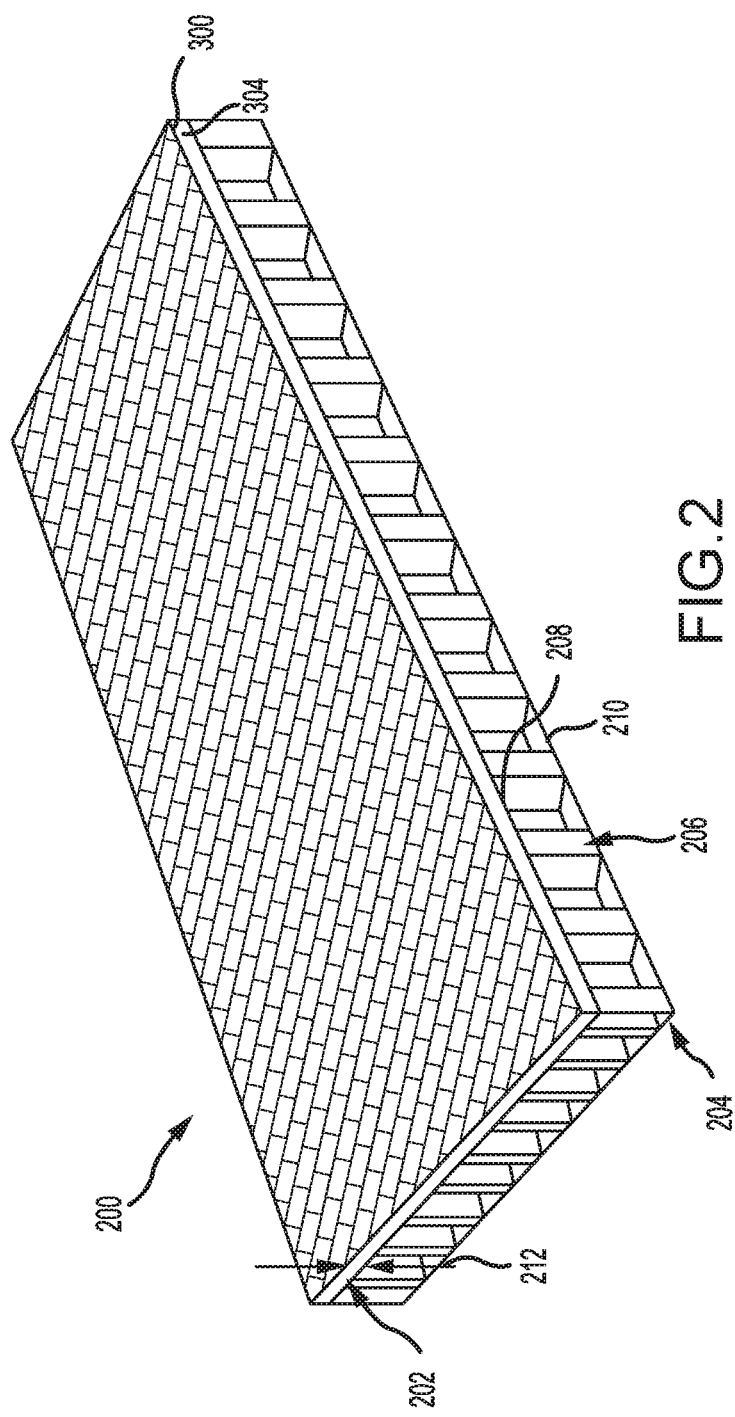
FIG. 2 illustrates a panel assembly for use in an aircraft and having a veneer panel with a carbon fiber face layer, in accordance with various embodiments.

Referring now to FIG. 2, a panel assembly 200, such as for use as a panel assembly 100 of FIG. 1, may include a first veneer panel 202, a second veneer panel 204, and an aviation honeycomb layer 206 located between the first veneer panel 202 and the second veneer panel 204. The first veneer panel 202 and the second veneer panel 204 may be bonded to the aviation honeycomb layer 206 using an adhesive, chemical bonding, one or more fastener, or the like. For example, the aviation honeycomb layer 206 may have a first surface 208 and a second surface 210. The first veneer panel 202 may be coupled or attached to the first surface 208, and the second veneer panel 204 may be coupled or attached to the second surface 210. Use of the aviation honeycomb layer 206 may result in a relatively sturdy panel assembly 200 having a relatively low density. It may be desirable to reduce a mass of aircraft components (achieved using high-density materials) because greater mass of the aircraft increases fuel consumption.

The second veneer panel 204 may include wood, aluminum, or the like, and may be treated with a fire retardant. For example, the second veneer panel 204 may be formed and then submerged in a bath of a fire retardant such as a water-based fire retardant which allows the fire retardant to flow into the material of the second veneer panel 204. The second veneer panel 204 may include one, two, or more plies of a wood material such as poplar, oak, or the like. In various embodiments, two or more plies may be oriented such that the grain of adjacent plies lie at an angle that is approximately 90 degrees relative to each other.

The aviation honeycomb layer 206 may include any aviation honeycomb material. For example, the aviation honeycomb layer 206 may include one or more of aluminum, fiberglass, an epoxy-based resin, a phenolic-based resin, a composite material, or the like. For example, the aviation honeycomb layer 206 may include columnar, hexagonal, or similar-shaped hollow cells oriented between relatively thin vertical walls.

Carbon fiber has been growing in popularity due to its relatively high tensile strength and its relatively impressive aesthetic appeal. However, it is relatively difficult to bond materials, such as metal or wood, to carbon fiber materials. While carbon fiber materials may be directly coupled to an aviation honeycomb layer, such as via use of fasteners, the resulting panel assembly has drawbacks. For example, a thickness of an entire panel assembly using a carbon fiber material as a first veneer panel may be less than a corresponding panel assembly without a carbon fiber material. In that regard, entities that manufacture aircraft furniture, such as cabinets or walls, may need to redesign features of the furniture, such as handles or knobs, to accommodate the different thickness.

Figure 3:
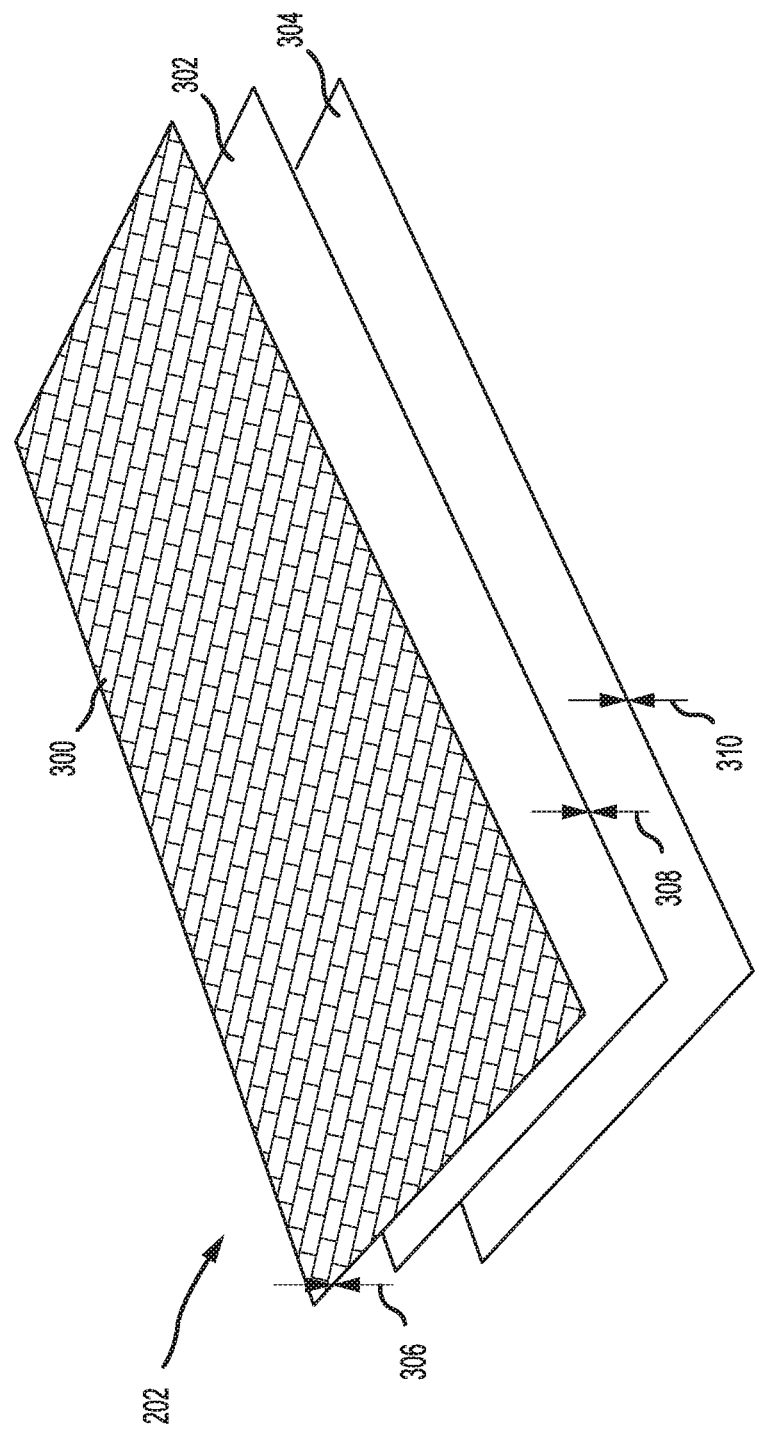
FIG. 3 illustrates a veneer panel for use in a panel assembly and having a carbon fiber face layer, in accordance with various embodiments.

Referring now to FIGS. 2 and 3, the first veneer panel 202 has been designed to include a face layer 300 that includes a carbon fiber material. The first veneer panel 202 may further include a backing layer 304 and an adhesive 302 used to attach the face layer 300 to the backing layer 304. The backing layer 304 may be oriented adjacent to the first surface 208 of the aviation honeycomb layer 206 such that the face layer 300 faces away from the aviation honeycomb layer 206. In that regard, the panel assembly 200 may be oriented in such a manner that the face layer 300 is exposed to be viewed by people in the environment of the panel assembly 200, and the second veneer panel 204 may be hidden from view.

The carbon fiber material of the face layer 300 may be provided in sheet form and may be cut to the desired shape of the first veneer panel 202. The carbon fiber material of the face layer 300 may include a flame-retardant carbon fiber veneer designed to resist the spread of fire. In various embodiments, the carbon fiber material may have desirable aesthetic properties such as a relatively deep luster and a relatively glossy mirror finish. For example, the carbon fiber material may include woven carbon fiber without any additives (such as a twill weave or a plain weave) or may include woven carbon fiber with fire retardant (or other) additives or fillers (such as a plastic, resin, or the like).

The backing layer 304 of the first veneer panel 202 may include any backing material such as one or more plies of wood, aluminum, or the like. For example, the backing layer 304 may include two plies of wood coupled together and positioned with the respective grains oriented at 90 degrees relative to each other.

The backing layer 304 may be treated with a fire retardant prior to being bonded to the adhesive 302. For example, the fire retardant may include a water-based fire retardant, and the backing layer 304 may be submerged into a bath of the fire retardant in order to provide fire resistant properties to the backing layer 304. A benefit of using a water-based fire retardant is that the water allows the fire retardant to be absorbed by the material of the backing layer 304. However, in various embodiments, non-water-based fire retardant may be used in addition to, or instead of, the water-based fire retardant.

The adhesive 302 may include specific properties that facilitate chemical bonding to the backing layer 304 and the face layer 300. In particular, the adhesive 302 may be a thermoset dry film adhesive, and may be a flame retardant, B-staged modified acrylic adhesive. In various embodiments, the adhesive 302 may include a thermosetting adhesive (such as a phenolic surface film), a phenolic resin system, a phenolic impregnated kraft paper, or the like. These specific properties may allow the adhesive 302 to bond with the carbon fiber of the face layer 300 and the wood, aluminum, or other material of the backing layer 304. The adhesive 302 may be formed or obtained in sheet form and may be cut to a desired shape of the first veneer panel 202.

These properties of the adhesive 302 allow the adhesive 302 to bond with untreated carbon fiber, which may be used in the face layer 300. Stated differently, the carbon fiber material may be an untreated carbon fiber material, meaning that the carbon fiber material lacks chemical or other treatment via conventional methods such as water-based fire retardant. In various embodiments, the carbon fiber material may be treated by the manufacturer but not during assembly of the first veneer panel 202, may be untreated by the manufacturer and during assembly of the first veneer panel 202, or may be treated during assembly of the first veneer panel and not by the manufacturer.

In various embodiments, the carbon fiber material may be created to be fire retardant by the manufacturer and processes during manufacture but may lack any additional treatment after manufacture is complete. For example, materials used in aircraft veneer panels may be treated, such as with a surface layer of a vinyl material, to facilitate bonding to other materials. However, the properties of the adhesive 302 facilitate bonding the adhesive 302 to the carbon fiber of the face layer 300 and to the material of the backing layer 304 without treatment of at least one of the face layer 300 or the backing layer 304.

Due to the fire-retardant treatment of the backing layer 304 (or inherent fire retardant properties of the backing layer 304) and the fire retardant properties of the carbon fiber of the face layer 300 and the adhesive 302, the first veneer panel 202 may satisfy the requirements set forth in Federal Aviation Regulations (FAR) Section 25.853, as described above.

To facilitate use of the first veneer panel 202 in conventional aerospace environments, the first veneer panel 202 may have a thickness 212 that is similar to a thickness of conventional veneer panels. The relatively constant thickness 212 of the first veneer panel 202 may be achieved by using a face layer 300 and an adhesive 302 each having relatively small thicknesses. For example, a thickness 306 of the face layer 300 (i.e., the carbon fiber material) may be between 0.005 inches (0.127 millimeters (mm)) and 0.05 inches (1.27 mm), between 0.01 inches (0.254 mm) and 0.05 inches (1.27 mm), between 0.02 inches (0.508 mm) and 0.03 inches (0.762 mm), or about 0.02 inches (0.508 mm). Where used in this context, about refers to the referenced value plus or minus 10 percent of the referenced value. For example, a thickness 308 of the adhesive may be between 0.001 inches (0.0254 millimeters) and 0.01 inches (0.254 millimeters), between 0.002 inches (0.0508 mm) and 0.01 inches (0.254 mm), between 0.002 inches (0.0508 mm) and 0.005 inches (0.127 mm), or about 0.002 inches (0.0508 mm).

Due to the above properties of the face layer 300 and the adhesive 302, the face layer 300 and the adhesive 302 may be applied to any backing layer 304. In that regard, the backing layer 304 may be formed to have a desired thickness, and addition of the face layer 300 and the adhesive 302 may minimally affect the thickness 212 of the first veneer panel 202. That is, the thickness of the backing layer 304 may be multiple times the combined thicknesses 306, 308 of the face layer 300 and the adhesive 302. This may be desirable as entities that purchase the first veneer panel 202 may have handles, knobs, or other features that are designed for a veneer panel having a predetermined thickness. In that regard, the existing handles, knobs, or other features may be coupled to the first veneer panel 202 without engineering changes made to the handles, knobs, or other features. This provides the added advantage of allowing the first veneer panel 202 to be used in many existing aerospace environments (such as existing cabinet systems), and/or as a replacement veneer panel in existing aerospace environments.

Figure 4:
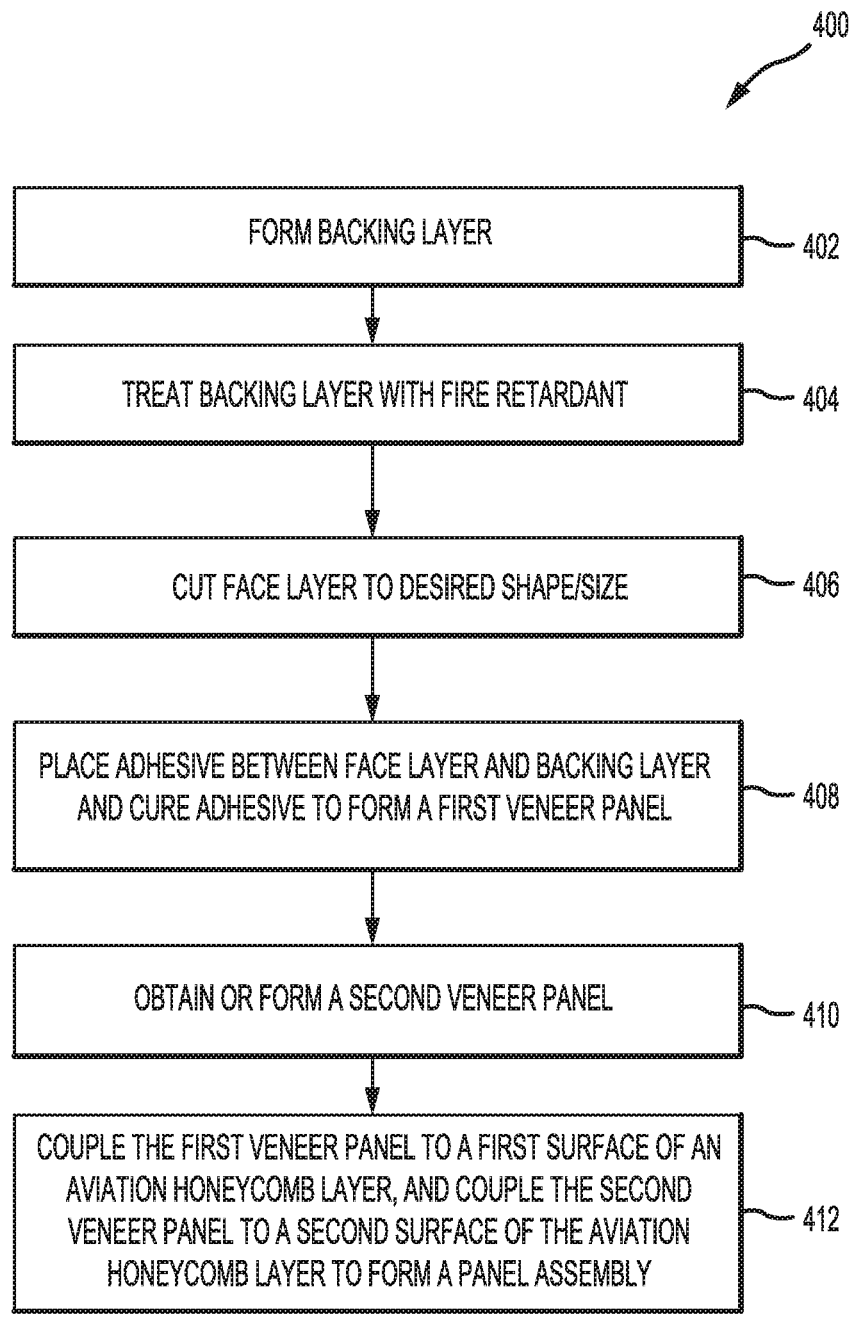
FIG. 4 illustrates a method for forming a panel assembly having a veneer panel with a carbon fiber face layer, according to various embodiments.

Referring now to FIG. 4, a method 400 for forming a panel assembly for use in aerospace applications, such as for use in cabinets or other furniture or components of an aircraft, is shown. The method 400 may begin at block 402 in which a backing layer is formed. The backing layer may be formed by cutting a single ply of a material, such as aluminum or wood, into a desired shape. In various embodiments, the backing layer may be formed by bonding or otherwise attaching two or more plies of wood or another material together. The resulting multiple ply component may then be cut into a desired shape, or the multiple plies may be cut into the desired shape before being coupled together.

In block 404, the backing layer may be treated with a fire retardant. For example, the backing layer may be submerged in a bath of a water-based or other fire retardant in order to treat the backing layer, causing the backing layer to be relatively fire resistant.

In block 406, a material for use as a face layer (such as a carbon fiber material) may be cut to a desired shape or size. For example, the carbon fiber material may be purchased in sheet form and may be cut to a desired shape of the panel assembly. In various embodiments, the carbon fiber material may include woven carbon fibers and may have fire retardant properties. In various embodiments, the carbon fiber material may lack fire retardant properties, and may thus be treated with a fire retardant in a similar manner as the backing layer in block 404. In various embodiments, a different method of treating the carbon fiber material with the fire retardant may be employed.

In block 408, an adhesive may be placed between the face layer and the backing layer. For example, the adhesive may be provided in sheet form and may be cut to a desired shape to match that of the face layer and the backing layer. In various embodiments, the adhesive may be provided with thin films on either surface that reduce the likelihood of premature curing of the adhesive. In that regard, the thin films may be removed prior to stacking the adhesive between the face layer and the backing layer. Once the adhesive is in place between the face layer and the backing layer, the adhesive may be cured. The adhesive may be a thermoset material and may be cured by any one or more of applying pressure to the assembly, increasing a temperature of the adhesive, or the like. Because the adhesive is a thermoset adhesive, the bonding to the face layer and the backing layer may be relatively sturdy because the adhesive may fail to reactivate after setting. After curing of the adhesive, the combination of the face layer, the adhesive, and the backing layer may be regarded as a first veneer panel.

In block 410, a second veneer panel may be obtained or formed. For example, the second veneer panel may be a veneer panel which may include wood, aluminum, or other materials. In various embodiments, the second veneer panel may include identical features as the first veneer panel and may be formed in a similar manner as the first veneer panel. In various embodiments, the second veneer panel may include different features than the first veneer panel. For example, the second veneer panel may include two or more plies of wood coupled together via an adhesive or a fastener, one or more plies of aluminum, or the like, without a carbon fiber material.

In block 412, the first veneer panel and the second veneer panel may be bonded or otherwise attached to a first surface and a second service, respectively, of an aviation honeycomb layer. In various embodiments, the aviation honeycomb layer may be purchased in a desired shape, may be cut to a desired shape, may be created or otherwise formed to have the desired shape, or the like. The first veneer panel and the second veneer panel may be bonded to the surfaces using an adhesive, may be attached to the surfaces using one or more fastener, or the like. The resulting assembly that includes the first veneer panel, the second veneer panel, and the honeycomb layer between the veneer panels may be regarded as a panel assembly for use in aircraft components, such as aircraft interior walls, furniture, or the like.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A veneer panel, comprising:
a face layer formed from a carbon fiber sheet, the carbon fiber sheet forming an exterior face of the veneer panel;
a backing layer comprising a first ply of wood; and
a thermoset dry film adhesive located between the face layer and the backing layer and attaching the face layer to the backing layer,
wherein the thermoset dry film adhesive is a flame-retardant, B-staged modified acrylic adhesive,
wherein the thermoset dry film adhesive directly contacts a surface of the carbon fiber sheet and a surface of the first ply of wood, and
wherein the veneer panel is configured for use in an aircraft interior.

2. The veneer panel of claim 1, wherein the carbon fiber sheet is untreated.

3. The veneer panel of claim 1, wherein the backing layer further includes a second ply of wood coupled to the first ply of wood.

4. The veneer panel of claim 1, wherein the backing layer is treated by submerging the backing layer into a water-based fire retardant.

5. The veneer panel of claim 1, wherein the face layer has a face thickness between 0.005 inches (0.127 millimeters) and 0.05 inches (1.27 millimeters).

6. The veneer panel of claim 5, wherein the thermoset dry film adhesive has an adhesive thickness of between 0.001 inches (0.0254 millimeters) and 0.01 inches (0.254 millimeters).

7. A panel assembly for use in an aircraft, the panel assembly comprising:
a first veneer panel having:
a face layer formed from a carbon fiber sheet, the carbon fiber sheet forming an exterior face of the panel assembly;
a backing layer comprising a first ply of wood, and
a thermoset dry film adhesive located between the face layer and the backing layer and attaching the face layer to the backing layer, wherein the thermoset dry film adhesive directly contacts a surface of the carbon fiber sheet and a surface of the first ply of wood of the backing layer, and wherein the thermoset dry film adhesive is a flame-retardant, B-staged modified acrylic adhesive;
a second veneer panel; and
an aviation honeycomb layer coupled between the second veneer panel and the backing layer of the first veneer panel.

8. The panel assembly of claim 7, wherein the carbon fiber sheet is untreated.

9. The panel assembly of claim 7, wherein the backing layer further includes a second ply of wood coupled to the first ply of wood, and wherein the backing layer is treated by submerging the first ply of wood and the second ply of wood into a water-based fire retardant.

10. The panel assembly of claim 7, wherein the face layer has a face thickness between 0.005 inches (0.127 millimeters) and 0.05 inches (1.27 millimeters).

11. The panel assembly of claim 10, wherein the thermoset dry film adhesive has an adhesive thickness of between 0.001 inches (0.0254 millimeters) and 0.01 inches (0.254 millimeters).

12. The panel assembly of claim 7, wherein the panel assembly satisfies requirements set forth in Federal Aviation Regulations (FAR) Section 25.853.

13. A method of forming a panel assembly for use in an aircraft, the method comprising:
   treating a backing layer with a fire retardant, the backing layer comprising a first ply of wood;
   placing a thermoset dry film adhesive between the backing layer and a face layer formed from a carbon fiber sheet, wherein the thermoset dry film adhesive is a flame-retardant, B-staged modified acrylic adhesive; and
   curing the thermoset dry film adhesive to couple the backing layer to the face layer to form a first veneer panel, wherein the thermoset dry film adhesive directly contacts a surface of the carbon fiber sheet and a surface of the first ply of wood of the backing layer.

14. The method of claim 13, further comprising obtaining or forming a second veneer panel and an aviation honeycomb layer having a first surface and a second surface, and coupling the first veneer panel to the first surface of the aviation honeycomb layer and coupling the second veneer panel to the second surface of the aviation honeycomb layer to form the panel assembly.

15. The method of claim 13, wherein the face layer has a face thickness between 0.005 inches (0.127 millimeters) and 0.05 inches (1.27 millimeters), and the thermoset dry film adhesive has an adhesive thickness of between 0.001 inches (0.0254 millimeters) and 0.01 inches (0.254 millimeters).

16. The method of claim 13, wherein the backing layer further includes a second ply of wood coupled to the first ply of wood.

17. A veneer panel, comprising:
   a face layer formed from a carbon fiber sheet, the carbon fiber sheet forming an exterior face of the veneer panel;
   a backing layer comprising a first ply of wood and a second ply of wood coupled to the first ply of wood, wherein the first ply of wood and the second ply of wood are positioned such that a grain orientation of the first ply of wood is perpendicular to a grain orientation of the second ply of wood; and
   a thermoset dry film adhesive located between the face layer and the backing layer and attaching the face layer to the backing layer,
   wherein the thermoset dry film adhesive directly contacts a surface of the carbon fiber sheet and a surface of the first ply of wood, and
   wherein the veneer panel is configured for use in an aircraft interior.

18. The veneer panel of claim 17, wherein the thermoset dry film adhesive has an adhesive thickness of between 0.001 inches (0.0254 millimeters) and 0.01 inches (0.254 millimeters).

19. The veneer panel of claim 17, wherein the face layer has a face thickness between 0.005 inches (0.127 millimeters) and 0.05 inches (1.27 millimeters).

20. The veneer panel of claim 17, wherein the thermoset dry film adhesive is a flame-retardant, B-staged modified acrylic adhesive.

* * * * *